United States Patent
Ikebukuro

(10) Patent No.: US 9,615,555 B2
(45) Date of Patent: Apr. 11, 2017

(54) SPOOL DEVICE FOR A FISHING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 338 days.

(21) Appl. No.: 14/464,399

(22) Filed: Aug. 20, 2014

(65) Prior Publication Data
US 2015/0090825 A1 Apr. 2, 2015

(30) Foreign Application Priority Data

Sep. 30, 2013 (JP) ................. 2013-203880

(51) Int. Cl.
*A01K 89/01* (2006.01)
*A01K 89/015* (2006.01)

(52) U.S. Cl.
CPC ................ *A01K 89/015* (2013.01)

(58) Field of Classification Search
CPC ............ A01K 89/0111; A01K 89/0113; A01K 89/015; A01K 89/01931
See application file for complete search history.

(56) References Cited

U.S. PATENT DOCUMENTS

| | | | | |
|---|---|---|---|---|
| 1,472,684 A * | 10/1923 | Schmid | ................ | A01K 89/015 242/279 |
| 2,438,440 A * | 3/1948 | Hirsch | ................ | A01K 89/015 242/118.4 |
| 4,746,079 A * | 5/1988 | Newell | ................ | A01K 89/015 242/118.4 |
| 4,805,849 A * | 2/1989 | Nanbu | ................ | A01K 89/015 242/271 |
| 5,333,812 A * | 8/1994 | Sato | ................ | A01K 89/015 242/261 |
| 5,746,381 A * | 5/1998 | Miyazaki | ............. | A01K 89/015 192/69.63 |
| 5,947,400 A * | 9/1999 | Tsutsumi | ........... | A01K 89/0111 242/246 |
| 6,032,894 A * | 3/2000 | Chapman | ............. | A01K 89/015 242/310 |
| 6,209,816 B1 * | 4/2001 | Hitomi | ................... | A01K 89/01 242/310 |
| 7,789,336 B1 * | 9/2010 | Nakagawa | ........... | A01K 89/015 242/317 |
| 2002/0027176 A1 * | 3/2002 | Ikuta | .................... | A01K 89/015 242/247 |
| 2004/0104291 A1 * | 6/2004 | Kitajima | ............ | A01K 89/0111 242/322 |

(Continued)

FOREIGN PATENT DOCUMENTS

JP 2001-112385 A 4/2001

*Primary Examiner* — Emmanuel M Marcelo
(74) *Attorney, Agent, or Firm* — Global IP Counselors, LLP

(57) ABSTRACT

A spool device includes a spool shaft and a spool. The spool shaft is rotatably mounted to the reel body. The spool is mounted to the spool shaft. The spool device has a notch part and a protruding portion. The notch part is disposed on one of the spool and the spool shaft. The notch part is formed in an axial direction of the spool shaft. The protruding portion is disposed on the other of the spool or the spool shaft. The protruding portion is configured to engage the notch part.

15 Claims, 9 Drawing Sheets

(56) References Cited

U.S. PATENT DOCUMENTS

| | | | |
|---|---|---|---|
| 2007/0029427 A1* | 2/2007 | Morise | A01K 89/01 |
| | | | 242/317 |
| 2010/0038464 A1* | 2/2010 | Nakagawa | A01K 89/015 |
| | | | 242/321 |
| 2011/0042500 A1* | 2/2011 | Saito | A01K 89/0111 |
| | | | 242/224 |
| 2011/0057063 A1* | 3/2011 | Kawasaki | A01K 89/015 |
| | | | 242/283 |
| 2011/0180646 A1* | 7/2011 | Hiraoka | A01K 89/006 |
| | | | 242/241 |
| 2012/0223173 A1* | 9/2012 | Niitsuma | A01K 89/015 |
| | | | 242/322 |
| 2013/0112795 A1* | 5/2013 | Niitsuma | A01K 89/00 |
| | | | 242/321 |

* cited by examiner

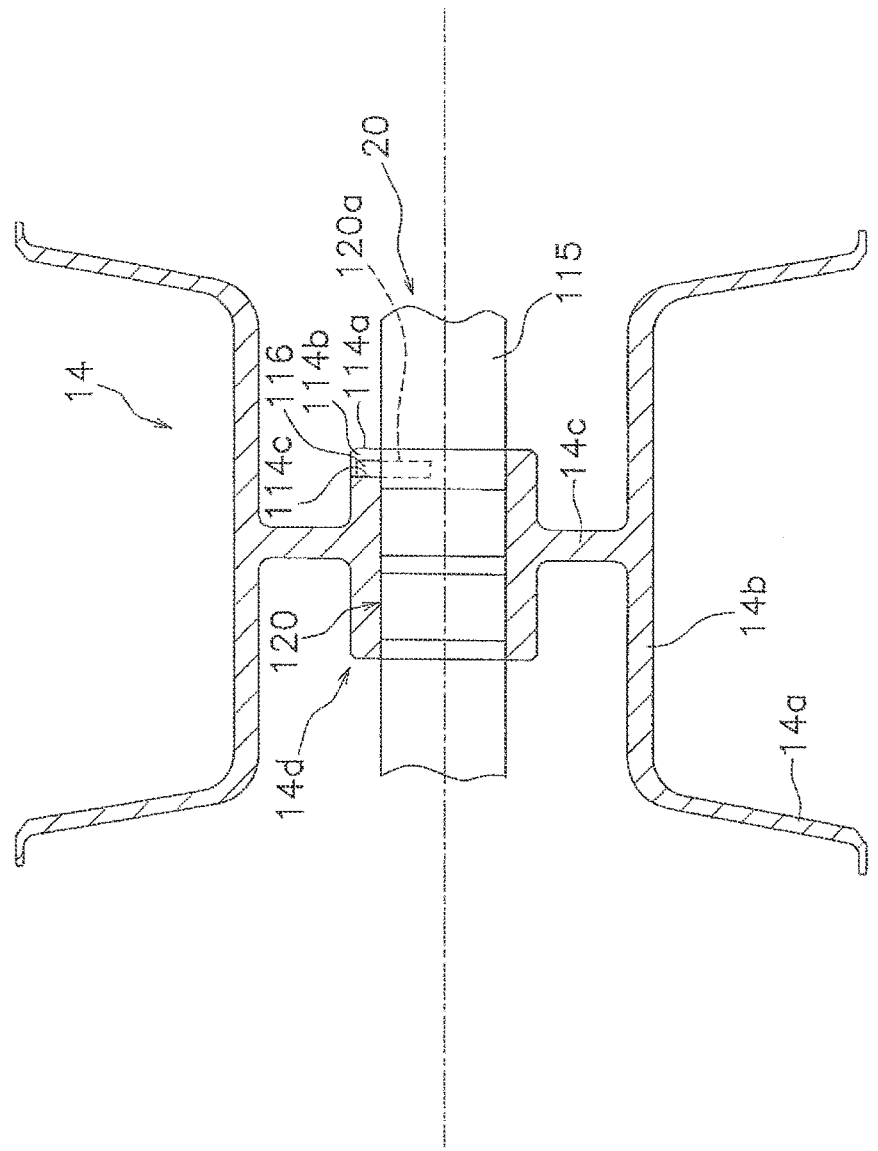

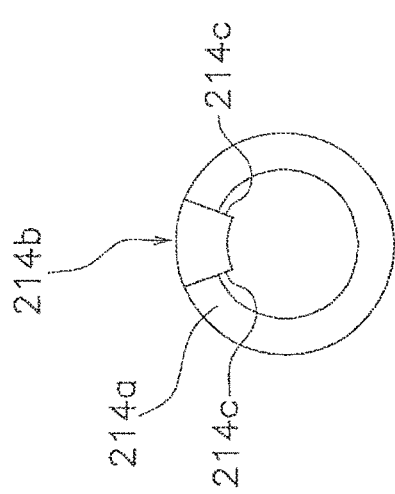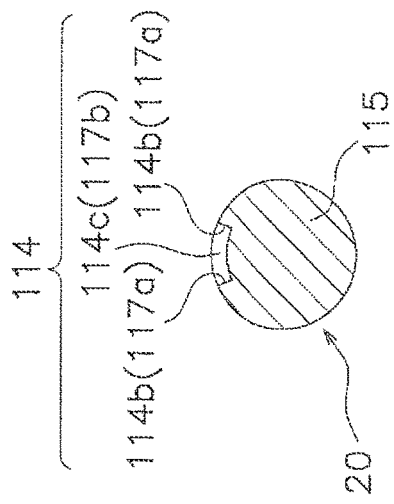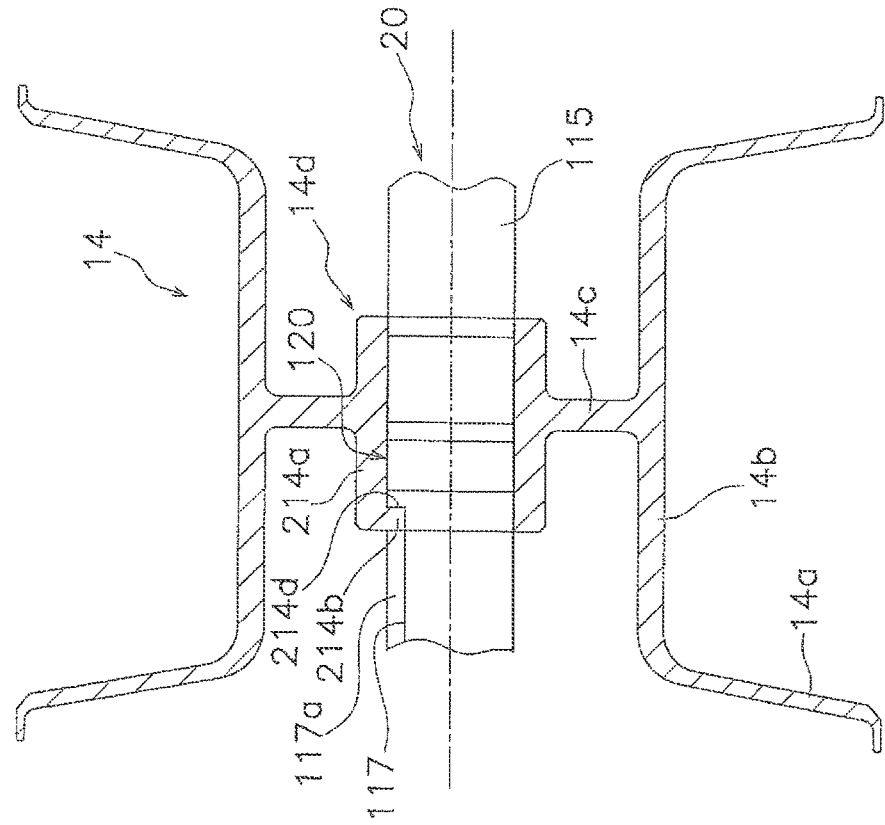

SPOOL DEVICE FOR A FISHING REEL

CROSS-REFERENCE TO RELATED APPLICATIONS

This application claims priority to Japanese Patent Application No. 2013-203880, filed on Sep. 30, 2013. The entire disclosure of Japanese Patent Application No. 2013-203880 is hereby incorporated herein by reference.

BACKGROUND

Field of Invention

The present invention relates to a spool device for a fishing reel and, in particular, to a spool device for a fishing reel comprising a spool shaft rotatably mounted to a fishing reel body and a spool body mounted to the spool shaft.

Background Information

A fishing reel, for example, a dual-bearing reel can include a reel body and a spool device. The spool device includes a spool shaft rotatably mounted to the reel body and a spool body mounted to the spool shaft (refer to U.S. Pat. No. 4,307,655). The spool body is comprises a fishing line winding cylindrical portion (here-in-after "shell portion") and a flange portion disposed on both ends of the shell portion. The spool body is mounted so as to integrally rotate with the spool shaft. Specifically, the spool body is mounted to the spool shaft by a latch pin disposed in the through-hole of the shell portion engaging the engaging hole of the spool shaft.

SUMMARY

In the case in which a spool body is to be mounted to a spool shaft in the conventional spool device, first, the spool shaft is inserted into the shaft mounting hole formed in the axial direction at an inner peripheral part of the spool body. Next, the through-hole that penetrates the shell portion of the spool body in the radial direction and the engaging hole of the spool shaft are positioned. Then, the latch pin is inserted into the through-hole in the shell portion of the spool body, and the extreme end portion of the latch pin is engaged in the engaging hole of the spool shaft. However, in this case, the engaging hole of the spool shaft is disposed in the inner portion of the shaft mounting hole of the spool body when the spool shaft is inserted into the shaft mounting hole of the spool body. Therefore, it is difficult to position the through-hole of the spool body and the engaging hole of the spool shaft. Accordingly, efficiency in mounting the spool body to the spool shaft decreases.

The present invention was made by giving consideration to the problem described above, and the object of the present invention is to enable easy assembly of a spool device for a fishing reel.

The spool device for the fishing reel related to the first aspect of the present invention comprises of a spool shaft and a spool body. The spool shaft is rotatably disposed on the fishing reel body. The spool body is mounted to the spool shaft. The spool body includes a notch part and a protruding portion. The notch part is disposed on one of the spool body and the spool shaft. The notch part is formed in an axial direction of the spool shaft. The protruding portion is disposed on the other of the spool body and the spool shaft. The protruding portion engages the notch part.

In the present spool device, the notch part where the protruding portion is engaged is cut out or formed in the axial direction of the spool shaft. Therefore, when mounting the spool body to the spool shaft, the protruding portion can easily engaged the notch part by inserting the spool shaft into the spool body. Accordingly, when mounting the spool body to the spool shaft, the protruding portion and the notch part can be engaged and confirmed visual. Therefore, the spool device can be assembled easily.

In the spool device for the fishing reel related to the second aspect of the present invention, the notch part in the spool device recited in the first aspect has an open end section, a first contact section, and a second contact section. The open end section opens in the axial direction of the spool shaft. The protruding portion contacts the first contact section in the rotational of the spool shaft. The protruding portion contacts the second contact section in the axial direction of the spool shaft.

In this configuration, the spool body is positioned in the axial direction of the spool shaft by inserting the protruding portion into the notch part from the open part and having the protruding portion contact the second contact section. Also, in this state, the protruding portion is positioned in the rotational direction of the spool shaft according to the first contact section. Accordingly, the spool body can be positioned easily in relation to the spool shaft.

In the spool device for the fishing reel related to the third aspect of the present invention, the spool body in the spool device recited in the first or second aspect has a mounting part for mounting the device to the spool shaft. The spool shaft has a shaft body part and a mounted part. The mounted part is disposed on the outer periphery of the shaft body part, and the spool body is mounted thereto. The notch part is disposed on the end portion of either the mounting part or the mounted part.

In this configuration, the notch part is disposed on the end portion of either the mounting part of the spool body or the mounted part of the spool shaft in the axial direction of the spool shaft. Therefore, the protruding portion can easily engaged the notch part by mounting the mounting part of the spool body to the mounted part of the spool shaft. Accordingly, the spool device can be assembled easily.

In the spool device for the fishing reel related to the fourth aspect of the present invention, the notch part in the spool device recited in the third aspect is disposed on the end portion of the mounting part of the spool body.

In this configuration, the spool device can be easily assembled by engaging the protruding portion of the spool shaft with the notch part at the end portion of the mounting part of the spool body.

In the spool device for the fishing reel related to the fifth aspect of the present invention, the notch part in the spool device recited in the third aspect is disposed on the end portion of the mounted part of the spool shaft.

In this configuration, the spool device can be easily assembled by engaging the protruding portion of the spool body with the notch part at the end portion of the mounted part of the spool shaft.

In the spool device for the fishing reel related to the sixth aspect of the present invention, the notch part in the spool device recited in the fifth aspect is one portion of a groove part disposed in the axial direction of the spool shaft.

In this configuration, the spool device can be easily assembled by moving the protruding portion of the spool body along the groove part of the spool shaft and engaging the protruding portion with the end portion of the groove part.

In the spool device for the fishing reel related to the seventh aspect of the present invention, the notch part in the spool device recited in the sixth aspect has a first contact section and a second contact section. The protruding portion contacts with the first contact section in the rotational direction of the spool shaft. The notch part contacts the second contact section in the axial direction of the spool shaft. The groove part has a first wall part and a second wall part. The first wall part is disposed in the rotational direction of the spool shaft. The second wall part is disposed in the axial direction of the spool shaft. Here, the first wall part includes the first contact section, and the second wall includes the second contact section.

In this protruding portion, the spool body is positioned in the axial direction of the spool shaft by inserting the protruding portion into the notch part along the groove part and having the protruding portion contact the second contact section (the second wall part of the groove part) of the notch part of the spool shaft. Also, in this state, this protruding portion is positioned in the rotational direction of the spool shaft according to the first contact section (the first wall part of the groove part) of the notch part of the spool shaft. Accordingly, the spool body can be easily positioned in relation to the spool shaft.

In the spool device for the fishing reel related to the eighth aspect of the present invention, the protruding portion in the spool device recited in any one of the first through seventh aspects is protrudes in the radial direction of the spool shaft.

In this configuration, the protruding portion protrudes in the radial direction of the spool shaft. Therefore, the protruding portion can be easily engaged with the notch part by inserting the spool shaft into the spool body. Accordingly, the spool device can be easily assembled.

In the spool device for the fishing reel related to the ninth aspect of the present invention, either the spool body or the spool shaft in the spool device recited in any one of the first through eighth aspects has a mounting hole disposed in the radial direction of either the spool body or the spool shaft. The protruding portion is a protruding pin mounted in the mounting hole.

In this configuration, the protruding portion can be easily formed simply by mounting the protruding pin in the mounting hole disposed in the radial direction of either the spool body or the spool shaft.

In the spool device for the fishing reel related to the tenth aspect of the present invention, the protruding pin in the spool device recited in the ninth aspect is fixed to the mounting hole by caulking.

In this configuration, the protrusion part can be easily formed without preparing any other special members simply by fixing the protruding pin to the mounting hole by caulking. Accordingly, the protruding pin can also be fixed easily.

In the spool device for the fishing reel related to the eleventh aspect of the present invention, the protruding pin in the spool device recited in the ninth aspect is fixed to the mounting hole by adhesion.

In this configuration, the protruding pin can be easily fixed by adhering the protruding pin to the mounting hole.

In the spool device for the fishing reel related to the twelfth aspect of the present invention, the mounting hole in the spool device recited in the ninth aspects has a female screw portion. The protruding pin has a male screw portion that engages the female screw portion. The protruding pin is engaged with the mounting hole.

In this configuration, the protruding pin can be easily and securely fixed and by engaging the protruding pin with the mounting hole.

In the spool device for the fishing reel related to the thirteenth aspect of the present invention, the mounting hole in the spool device recited in any one of the ninth through twelfth aspects is disposed in the spool shaft. The mounting hole is a through-hole that penetrates the spool shaft in the radial direction. The protruding pin is longer than the diameter of the spool shaft. In the state in which the protruding pin has been mounted in the through-hole, at least one of the two end portions of the protruding pin protrudes from the spool shaft.

In this configuration, at least one of the two end portions of the protruding pin protrudes from the spool shaft by mounting the protruding pin in the mounting hole. Therefore, the protruding portion can be easily formed.

In the spool device for the fishing reel related to the fourteenth aspect of the present invention, the spool body in the spool device recited in the eighth aspect has a mounting part for mounting the device to the spool shaft. The protruding portion is a bent portion. The protruding portion, that is, the bent portion is formed by the end portion of the mounting part disposed in the axial direction of the spool shaft being partially bent towards the spool shaft.

In this configuration, the protruding portion can be easily formed by partially bending the end portion of the mounting part disposed in the axial direction of the spool shaft towards the spool shaft.

In the spool device for the fishing reel related to the fifteenth aspect of the present invention, the bent portion in the spool device recited in the fourteenth aspect has a third contact section and a fourth contact section. The third contact section contacts the notch part in the rotational direction of the spool shaft. The fourth contact section contacts the notch part in the axial direction of the spool shaft.

In this configuration, the spool body is positioned in relation to the rotational direction of the spool shaft by the third contact section of the bent portion making contact with the notch part. Also, the spool body is positioned in relation to the axial direction of the spool shaft by the fourth contact section of the bent portion making contact with the notch part. Accordingly, the spool body can be easily positioned in relation to the spool shaft.

According to the present invention, the spool device for the fishing reel can be assembled easily.

BRIEF DESCRIPTION OF THE DRAWINGS

FIG. 9 is a cross-sectional view of a spool device according to the second embodiment of the present invention.

FIG. 10A is a cross-sectional view of a spool device according to the third embodiment of the present invention.

FIG. 10B is a side view of the mounting portion of a spool body according to the third embodiment of the present invention.

FIG. 10C is a cross-sectional view of a spool shaft according to the third embodiment of the present invention.

DETAILED DESCRIPTION OF THE INVENTION

1. Overall Configuration of the Reel

Figure 1:
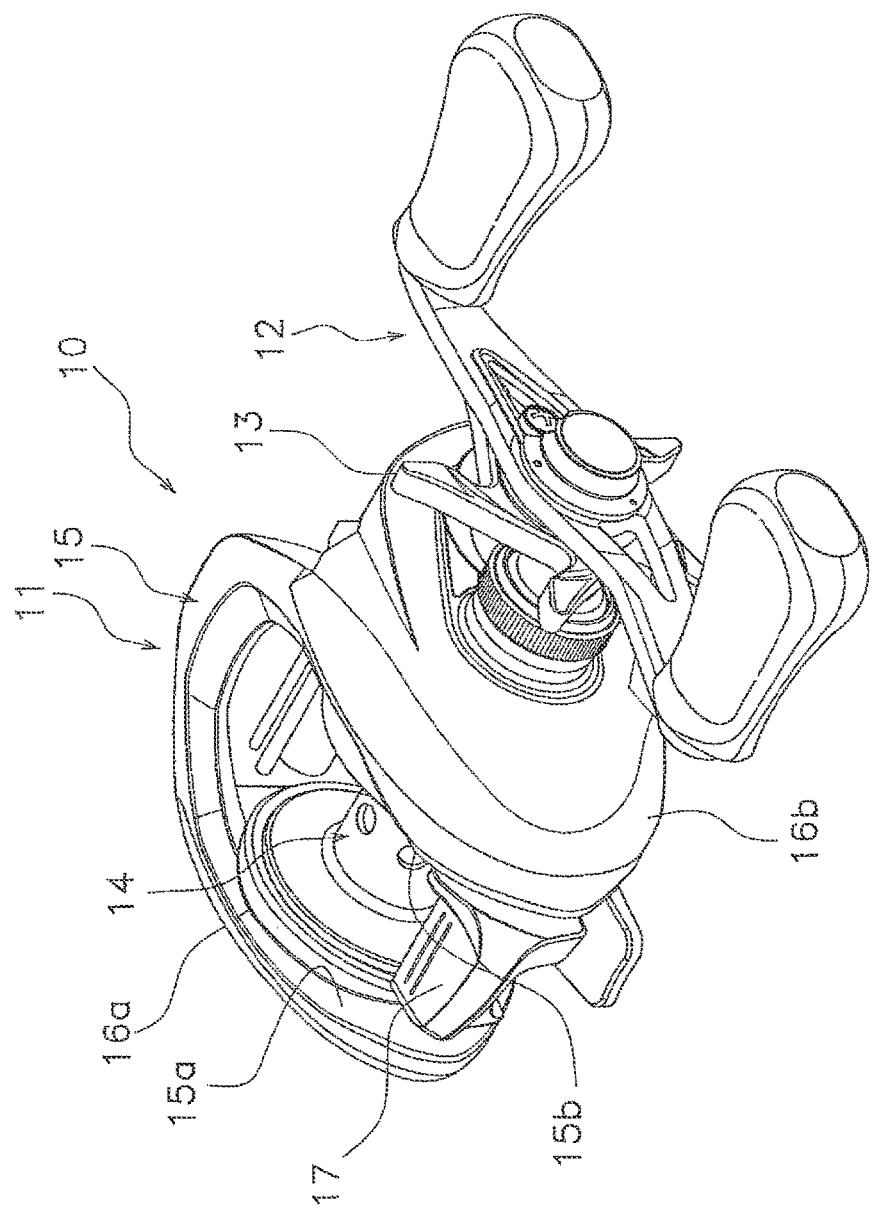
FIG. 1 is a perspective view of a dual-bearing reel according to the first embodiment of the present invention.
Figure 2:
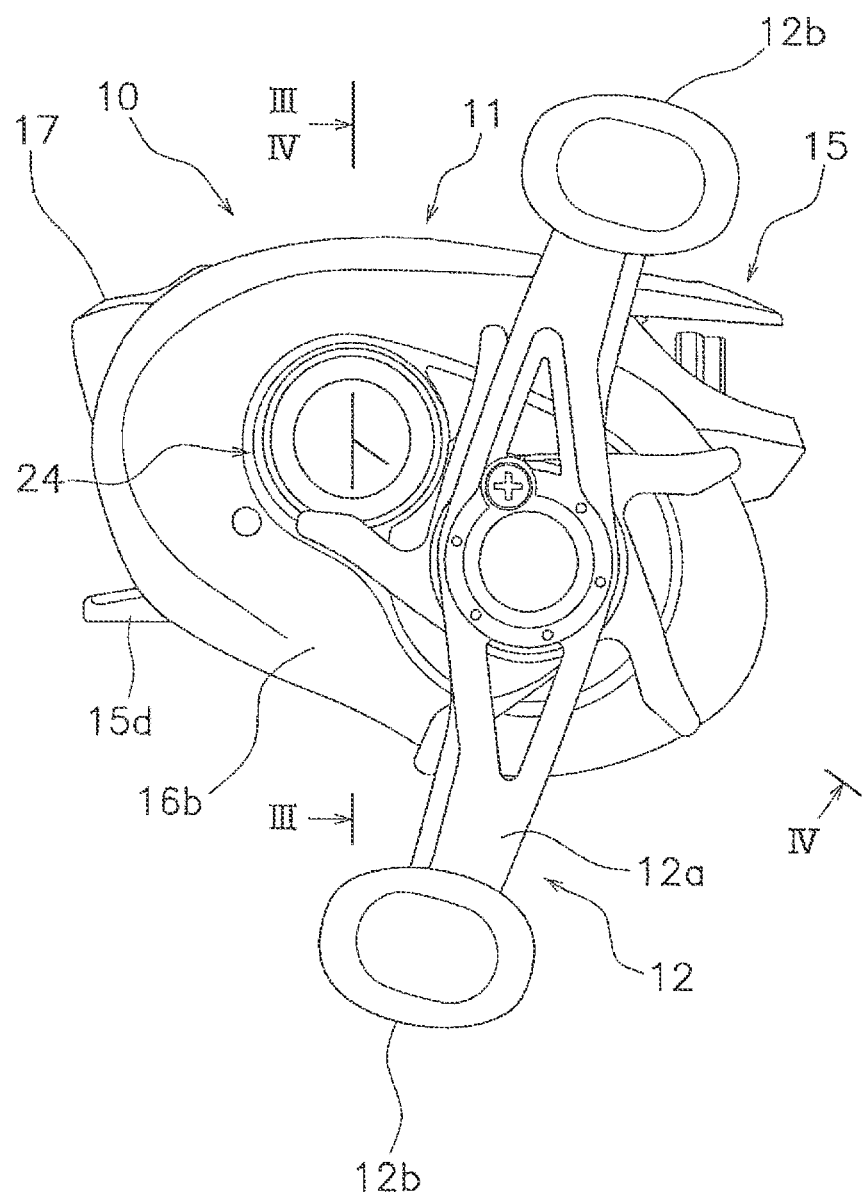
FIG. 2 is a right side view of the above.

As illustrated in FIG. 1 to FIG. 4, the dual-bearing reel 10 according to an embodiment of the present invention is a dual-bearing reel for bait casting. This reel is equipped with a reel body 11, a handle 12 for rotating the spool device disposed at the side of the reel body 11, a star drag 13 for adjusting the drag disposed on the reel body 11 side of the handle 12, and a spool device 9 comprised of a spool body 14 and a spool shaft 20.

The handle 12 has an arm part 12a and a handle 12b that is rotatably mounted on both ends of the arm part 12a. The arm part 12a is non-rotatably mounted to the extreme end of the drive shaft 30 and is fastened to the drive shaft 30 with a nut 28. The handle 12 is disposed on the second cover 16b side described below.

2. Configuration of the Reel Body

The reel body 11 is a member made from a light metal such as a magnesium alloy or the like. As illustrated in FIG. 1 to FIG. 4, the reel body 11 has a frame 15, a first side cover 16a and a second side cover 16b mounted on both sides of the frame 15, and a shaft support part 35. The spool body 14 is rotatably mounted on the inside of the reel body 11 via a spool shaft 20. The first side cover 16a is detachably mounted to the first side plate 15a and covers the outside of the first side plate 15a. The second side cover 16b is fixed to the second side plate 15b and covers the outside of the second side plate 15b.

As illustrated in FIG. 1 to FIG. 4, the spool body 14, a clutch operating member 17 for applying the thumb when touching the thumb to the spool, and a level winding mechanism 18 for winding the fishing line evenly onto the spool body 14 are disposed in the frame 15.

Also, a gear mechanism 19, a clutch mechanism 21, a clutch control mechanism 22, a drag mechanism 23, and a casting control mechanism 24 are disposed between the frame 15 and the second side cover 16b.

Figure 4:
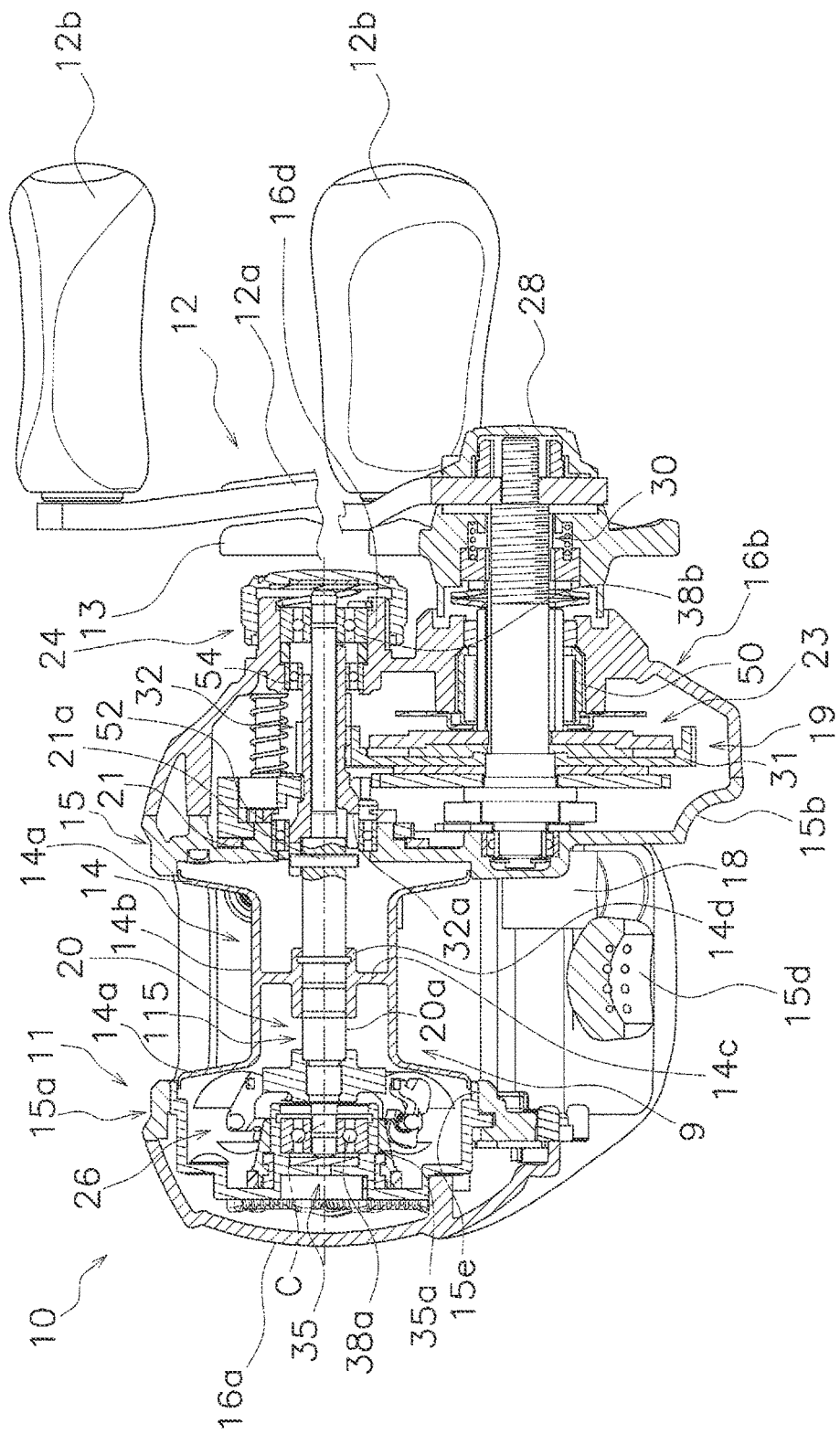
FIG. 4 is a cross-sectional view at section IV-IV in FIG. 2.

The gear mechanism 19 is disposed so as to transmit the rotational force from the handle 12 to the spool body 14 and the level winding mechanism 18. The gear mechanism 19 has a drive shaft 30, a drive gear 31 fixed to the drive shaft 30, and a cylindrical pinion gear 32 that meshes with the drive gear 31, as illustrated in FIG. 4. The drive shaft 30 is rotatably mounted to the second side plate 15b and the second side cover 16b. The drive shaft 30 is prohibited from rotating (reversing) in the fishing line releasing direction according to a roller-type one-way clutch 50. The roller-type one-way clutch 50 is disposed between the second side cover 16b and the drive shaft 30. The drive gear 31 is rotatably mounted to the drive shaft 30 and is coupled to the drive shaft 30 via the drag mechanism 23.

Figure 3:
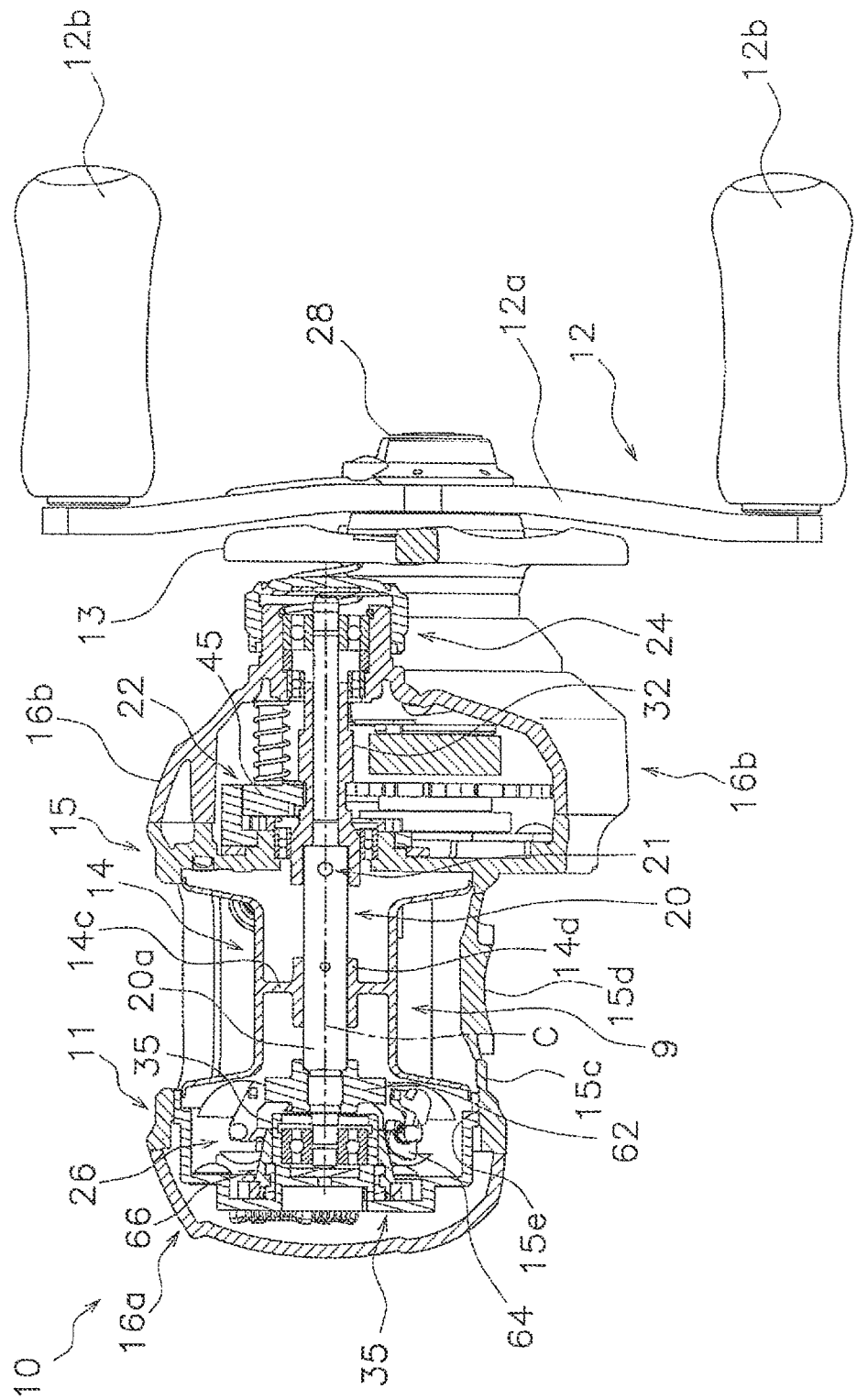
FIG. 3 is a cross-sectional view at section III-III in FIG. 2.

The clutch mechanism 21 is disposed so as to connect and disconnect the spool body 14 and the handle 12. The clutch control mechanism 22 is disposed so as to control the clutch mechanism 21 according to an operation of a clutch operating member 17. As illustrated in FIG. 3, the clutch control mechanism 22 has a clutch yoke 45 that moves the pinion gear 32 along the axial direction of the spool shaft 20. When the clutch operating member 17 is manipulated to the clutch off position, the clutch yoke 45 moves the pinion gear 32 to the clutch off position. Also, the clutch control mechanism 22 has a clutch returning mechanism not illustrated in the drawing that turns on the clutch mechanism 21 by interlocking with the rotation of the spool body 14 in the fishing line winding direction.

As illustrated in FIG. 1, the clutch operating member 17 is disposed behind the spool body 14 at the rear part between the first side plate 15a and the second side plate 15b. The clutch operating member 17 is coupled to the clutch control mechanism 22. The clutch mechanism 21 is switched between the connected state and the disconnected state by sliding the clutch operating member 17. The drag mechanism 23 is disposed so as to apply a brake to the rotation of the spool body 14 in the fishing line releasing direction. The casting control mechanism 24 is disposed so as to adjust the resistance force when the spool body 14 is rotating.

The spool braking device 26 prohibits backlash at the time of casting according to the function of centrifugal force. The spool braking device 26 is disposed between the frame 15 and the first side cover 16a. The spool braking device 26 is equipped with a brake drum 66, a rotating member 62, and a plurality of (e.g., 6) brake shoes 64, as illustrated in FIG. 3. The brake drum 66 is supported by the shaft supporting part 35 in the radially inward direction of the brake shoe 64. The rotating member 62 is coupled to the spool shaft 20 so as to rotate integrally according to a suitable fixing means or manner, such as a press fitting or the like. The brake shoe 64 is mounted to the rotating member 62 to rock around an axis that counters the spool shaft 20. In the spool braking device 26, the brake shoe 64 rocks according to centrifugal force and contacts the brake drum 66 when the spool body 14 rotates. Accordingly, braking is applied to the rotation of the spool body 14.

As illustrated in FIG. 3 and FIG. 4, the pinion gear 32 penetrates the second side plate 15b and extends in the axial direction of the spool shaft 20. The pinion gear 32 is a cylindrical member, the center of which is penetrated by the spool shaft 20. The pinion gear 32 is mounted to the second side plate 15b and the second side cover 16b to rotate and to move in the axial direction. The pinion gear 32 is supported by a bearing 52 and a bearing 54. An engaging groove 32a that engages with the clutch pin 21a is formed at one end (the left end in FIG. 4) of the pinion gear 32. The clutch mechanism 21 is formed from this pinion gear 32 and the clutch pin 21a. The pinion gear 32 is moved to the clutch on position and the clutch off position by the clutch control mechanism 22.

As illustrated in FIG. 3 and FIG. 4, the frame 15 has a first side plate 15a, a second side plate 15b that is disposed to be a prescribed interval from the first side plate 15a and so that they oppose each other, and a plurality of (e.g., 3) coupling portions 15c that integrally couple the first side plate 15a and the second side plate 15b at the front, the rear, and the bottom portions. A fishing pole mounting part 15d for mounting a fishing pole is integrally formed to the bottom side coupling portion 15c. An open part 15e formed into a circular shape with the shaft core C of the spool shaft 20 as the center is formed at the center part of the first side plate 15a. A shaft supporting part 35 is detachably coupled to the open part 15e.

As illustrated in FIG. 3 and FIG. 4, the spool device 9 is primarily configured from a spool body 14 and a spool shaft 20. The spool body 14 is mounted to the spool shaft to rotate integrally. For example, the spool body 14 is disposed between the first side plate 15a and the second side plate 15b. The spool body 14 is rotatably supported by the reel body 11.

The spool body 14 has a fishing line winding cylindrical portion (here-in-after "shell portion") 14b, flange portion 14a, a coupling portion 14c, and a mounting portion 14d. The shell portion 14b is formed into a cylindrical shape and a fishing line is wound on the outer peripheral portion. The flange portion 14a is disposed on both end portions of the shell portion 14b. The coupling portion 14c couples the shell portion 14b and the mounting portion 14d. The coupling portion 14c is formed into a ring shape. The coupling portion 14c is formed integrally with the shell portion 14b and the mounting portion 14d.

The mounting portion 14d is the section for mounting the spool body 14 to the spool shaft 20. The mounting portion 14d is mounted to the inner peripheral portion of the shell portion 14b. Specifically, the mounting portion 14d is formed integrally with the coupling portion 14c at the inner peripheral portion of the coupling portion 14c. The mounting portion 14d is formed into a cylindrical shape. Accordingly, the mounting portion 14d has an insertion hole 64d (refer to FIG. 6) into which the spool shaft 20 is inserted. The spool shaft 20 is inserted through the insertion hole 64d of the mounting portion 14d, and the spool body 14 is mounted to the spool shaft 20 so as to rotate integrally.

Figure 5:
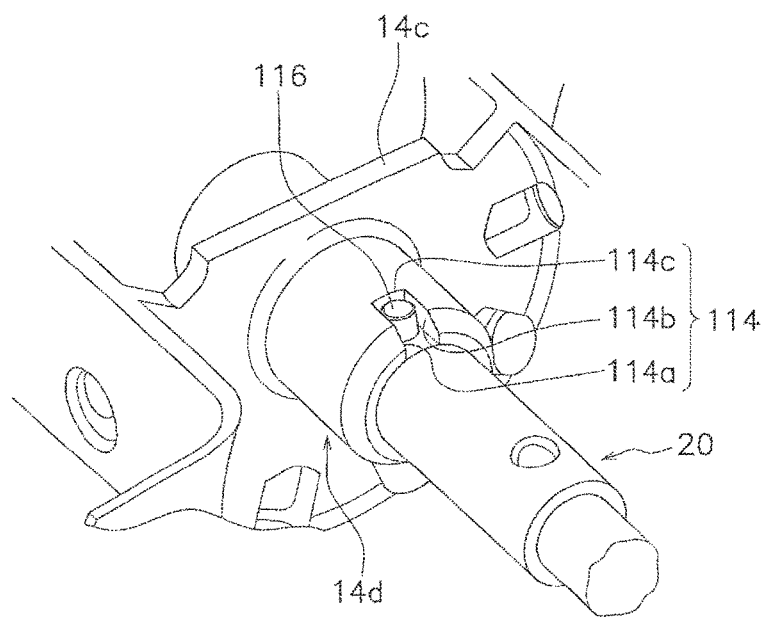
FIG. 5 is a partially enlarged perspective view of a spool device.
Figure 6:
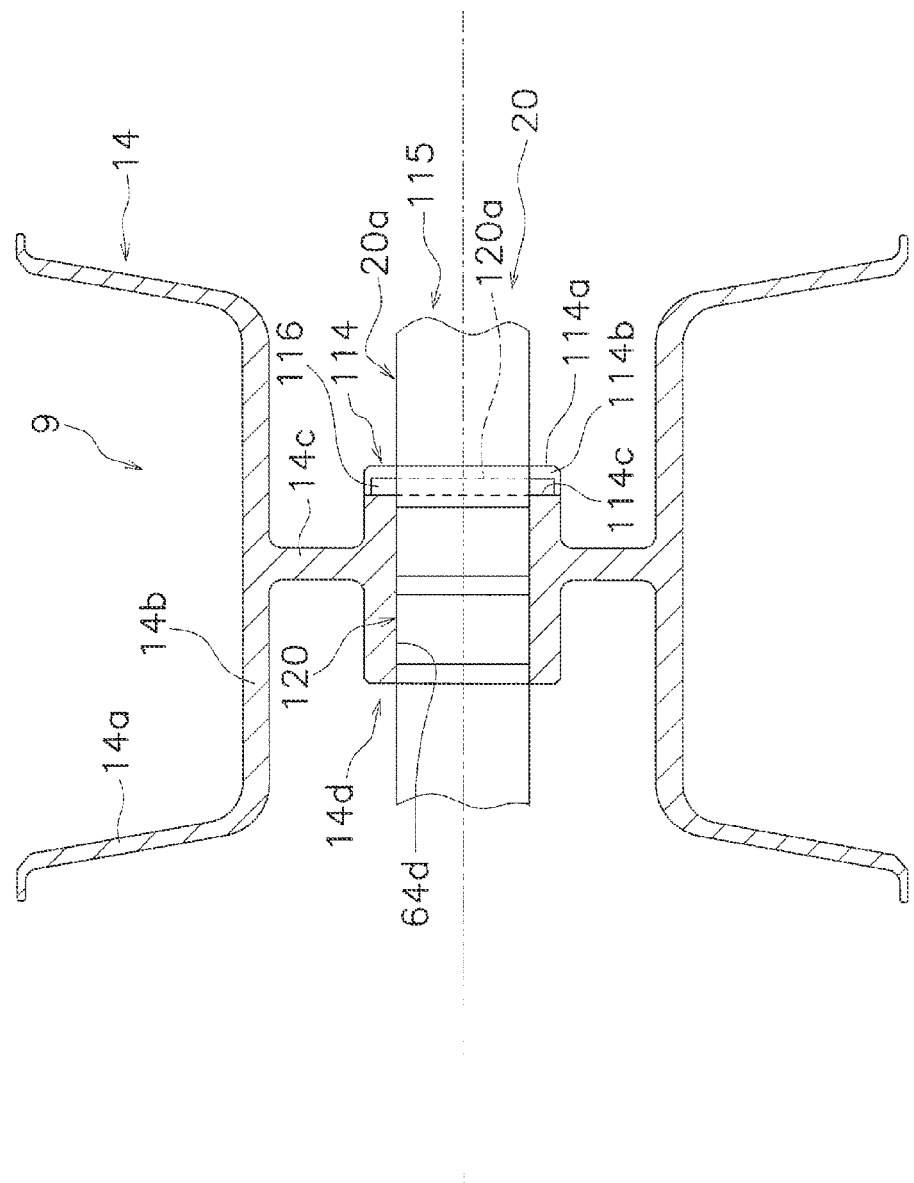
FIG. 6 is a cross-sectional view of a spool device.

As illustrated in FIG. 5 and FIG. 6, the mounting portion 14d has a notch part 114. The notch part 114 is disposed on the end portion of the mounting portion 14d. Also, the notch part 114 is cut out or formed in the axial direction of the spool shaft 20. For example, the notch part 114 is formed in a concave shape at the end portion of the mounting portion 114d. In the notch part 114, for example, the concave part has an open end section 114a, a first contact section 114b, and a second contact section 114c. The open end section 114a is the section that opens toward the axial direction of the spool shaft 20. The first contact section 114b is a pair of wall parts that mutually oppose each other in the concave-shaped notch part 114. A protruding portion makes contact with the first contact section 114b in the rotational direction of the spool shaft 20. The second contact section 114c is the bottom section of the concave-shaped notch part 114. A protruding pin 116 described below contacts the second contact section 114c in the axial direction of the spool shaft 20.

The spool shaft 20 is rotatably disposed on the reel body 11. A spool body 14 is mounted on the spool shaft 20. For example, the spool shaft 20 is made from a non-magnetic metal. As illustrated in FIG. 3 and FIG. 4, the spool shaft 20 penetrates the second side plate 15b and extends to the outside of the second side cover 16b.

As illustrated in FIG. 4, FIG. 5, and FIG. 6, the spool shaft 20 has a shaft body part 115 and a protruding pin 116. The one end (the left side in FIG. 4) of the shaft body part 115 is rotatably supported in a bearing storage part 35a via a bearing 38a. The other end (the right side in FIG. 4) of the shaft body part 115 that extends toward the outside of the second side cover 16b is rotatably supported in the boss part 16d formed to the second side cover 16b by a bearing 38b.

As illustrated in FIG. 4, a large-diameter section 20a is formed at the middle portion of the shaft body part 115. A clutch pin 21a that forms the clutch mechanism 21 is disposed in the section where the large-diameter section 20a penetrates the second side plate 15b by penetrating the plate in the radial direction. Both ends of the clutch pin 21a protrude respectively from the outer peripheral surface of the spool shaft 20.

Figure 7:
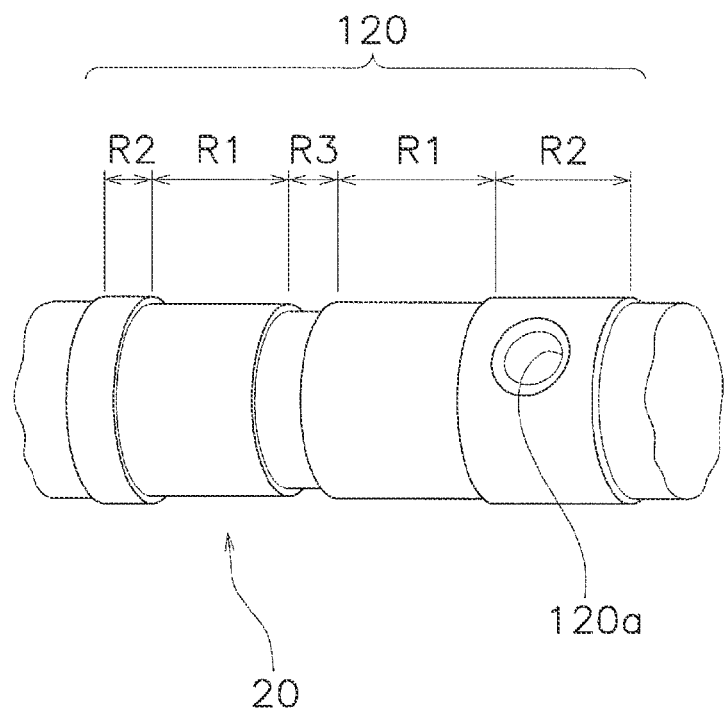
FIG. 7 is a partially enlarged perspective view of a spool shaft.
Figure 8:
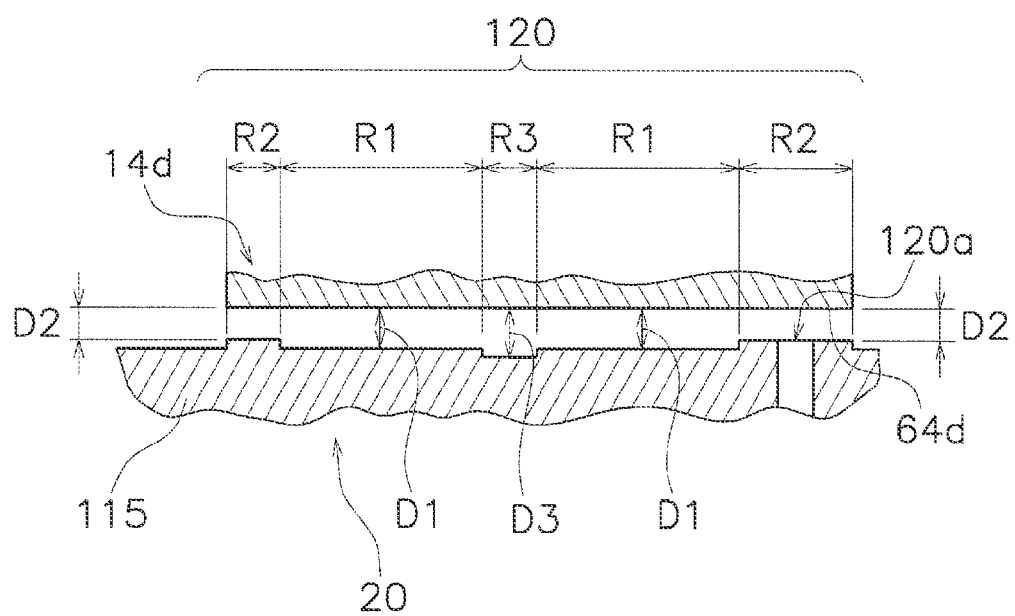
FIG. 8 is a partially enlarged cross-sectional view of a spool shaft.

As illustrated in FIG. 6, FIG. 7, and FIG. 8, the large-diameter section 20a has a mounted part 120. The mounted part 120 is disposed on the outer peripheral portion of the large-diameter section 20a. The mounting portion 14d (refer to FIG. 6) of the spool body 14 is mounted to the mounted part 120 and, more specifically, is disposed on the mounted part 120 by opposing the insertion hole 64d of the mounting portion 14d.

The mounted part 120 has a pin mounting hole 120a (one example of the mounting hole) disposed in the radial direction of the spool shaft 20. For example, the pin mounting hole 120a is a through-hole that penetrates in the radial direction of the spool shaft 20. Specifically, the pin mounting hole 120a penetrates in the radial direction of the spool shaft 20 at the second region R2 of the mounted part 120 described below. A protruding pin 116 (one example of the protruding portion) is mounted in the pin mounting hole 120a. The protruding pin 116 is fixed to the pin mounting hole 120a by, for example, caulking.

As illustrated in FIG. 6, the protruding pin 116 protrudes outward from the mounted part 120 (the outer peripheral portion of the shaft body part 115). The protruding pin 116 is formed to be longer than the diameter of the shaft body part 115 in the mounted part 120. In the state in which the protruding pin 116 has been mounted in the pin mounting whole 120a, the two end portions of the protruding pin 116 protrude respectively from the outer peripheral portion of the mounted part 120. The two end portions of the protruding pin 116 engage with the notch part 114 in the mounting portion 14d of the spool body 14.

Also, as illustrated in FIG. 7 and FIG. 8, the mounted part 120 has a first region R1, a second region R2, and a third region R3. A fixing agent, for example, an adhesive, is coated in the first region R1, the second region R2, and the third region R3. In FIG. 8, the first gap D1 and the third gap D3 described below are shown through an enlargement that is larger than the size of the actual gaps.

The first region R1 is the region for fixing the spool body 14 to the spool shaft 20 by adhesion. The first region R1 is formed into a ring shape on the outer peripheral portion of the mounted part 120. Multiple first regions R1, for example, two first regions R1, are disposed on the outer peripheral portion of the mounted part 120 by providing a prescribed space in the axial direction of the spool shaft 20. Also, the two first regions R1 are between the two second regions R2. A difference in the level is formed between the first regions R1 and the second regions R2. The diameter of the first region R1 is smaller than the diameter of the second region R2.

A first gap D1 is formed between the first region R1 and the insertion hole 64d of the spool body 14. An adhesive is disposed in the first gap D1. The first gap D1 is larger than the second gap D2 described below. The first gap D1 is set at, for example, 0.05 mm. In one example, the adhesive is disposed in the first gap D1 by inserting the spool shaft 20 into the insertion hole 64d of the spool body 14 in a state of having coated an adhesive in the first region R1, the second region R2, and the third region R3. The mode for disposing the adhesive in the first gap D1 is described in details in "3. Assembly and fixation of the spool device" discussed below.

The second region 82 is primarily a region for positioning the spool body 14 in the radial direction. The second region 82 is a region in which the adhesive is coated thereon. The second region R2 is formed into a ring shape at the outer peripheral portion of the mounted part 120. Multiple second regions R2, for example, two second regions R2, are disposed on the outer peripheral portion of the mounted part 120 by providing a prescribed space in the axial direction of the spool shaft 20. Specifically, the two second regions R2 are formed at the two end portions of the mounted part 120. The diameter of the second region R2 is larger than the diameter of the first region R1.

A second gap D2 is formed between the second region R2 and the insertion hole 64d of the spool body. The second gap D2 is a very small gap since it is a gap that surrounds the second region R2 for positioning the spool body 14 in the radial direction. An adhesive is disposed in the second gap D2. The second gap D2 is smaller than the first gap D1. The second gap D2 is set at, for example, ≤0.01 mm. In one example, adhesive that includes the excess adhesive from the first gap D1 is disposed in the second gap D2 by inserting the spool shaft 20 into the insertion hole 64d of the spool body 14 in a state of having coated an adhesive in the first region R1, the second region R2, and the third region R3. The mode for disposing the adhesive in the second gap D2 is described in details in "3. Assembly and fixation of the spool device" discussed below.

The third region R3 is primarily a region in which the adhesive is retained. The third region R3 is also a region in which the adhesive is coated thereon. For example, the excess adhesive discharged from the first gap D1 is retained in the third gap D3. The third region R3 is an annular groove formed into a ring shape at the outer peripheral portion of the mounted part 120. The third region R3 is between two second regions R2. More specifically, the third region R3 is between two first regions R1. A difference in the level is formed between the third region R3 and the first region R1. The diameter of the third region R3 is smaller than the diameter of the first region R1 and the diameter of the second region R2.

A third gap D3 is formed between the third region R3 and the insertion hole 64d of the spool body 14. The third gap D3 is larger than the first gap D1. Specifically, the third gap D3 is larger than the first gap D1 and the second gap D2. An adhesive is disposed in the third gap D3. The third gap D3 is set at, for example, 0.15 mm. In one example, adhesive that includes the excess adhesive discharged from the first gap D1 is disposed in the third gap D3 by inserting the spool shaft 20 into the insertion hole 64d of the pool 14 in a state of having coated an adhesive in the first region R1, the second region R2, and the third region R3. The mode for disposing the adhesive in the third gap D3 is described in details in "3. Assembly and fixation of the spool device" discussed below.

Here, the first gap D1, the second gap D2, and the third gap D3 are defined by the distance in the radial direction between the outer peripheral surface of the mounted part 120 (the first region R1, the second region R2, and the third region R3) of the spool shaft 20 and the inner peripheral surface of the insertion hole 64d of the spool body 14.

3. Assembly and Fixation of the Spool Device

First, an adhesive is coated in the first region R1, the second region R2, and the third region R3 in the mounted part 120 of the spool shaft 20. Next, the spool shaft 20 is inserted into the insertion hole 64d in the mounting portion 14d of the spool body 14 from the one end side to the other end side of the mounting portion 14d of the spool body 14. Next, the protruding pin 116 (both end portions) of the spool shaft 20 is engaged with the notch part 114 in the mounting portion 14d of the spool body 14. Specifically, the protruding pin 116 contacts the first contact section 114b and the second contact section 114c of the notch part 114. Accordingly, the spool body 14 is positioned in relation to the spool shaft 20 in the axial direction of the spool shaft (20) (the axial direction of the spool shaft 20) and in the rotational direction of the spool shaft 20. Also, in this state, both end portions of the mounted part 120 of the spool shaft 20, namely, the second region R2 of the mounted part 120, are disposed so as to oppose the both end portions of the insertion hole 64d of the mounting portion 14d. Accordingly, the spool body 14 is positioned in relation to the spool shaft 20 in the radial direction with the spool shaft 20 as reference. Consequently, the second gap D2 that surrounds the second region R2 is a very small gap.

Also, as described herein, when the spool shaft 20 is inserted into the insertion hole 64d in the mounting portion 14d of the spool body 14 in a state in which an adhesive has been coated in the first region R1, the second region R2, and the third region R3, the adhesive is filled evenly in the first gap D1 according to a shearing force functioning on the adhesive. Accordingly, the first gap D1 formed around the first region R1 can be made to function as a space (an adhering space) for adhering the insertion hole 64d in the mounting portion 14d of the spool body 14 and the mounted part 120 of the spool shaft 20. Also, the excess adhesive discharged from the first gap D1 infiltrates the third gap D3, and the third gap D3 is filled. The third gap D3 formed around the third region R3, as described above, can even be made to function as a storage space for the excess adhesive in addition to functioning as an adhering space. Furthermore, the adhesive is held back by the second region R2 and is kept between the two second regions R2 (the first gap D1 and the third gap D3). Also, the excess adhesive that was left between the two second regions R2 (the first gap D1 and the third gap D3) is extruded to the second gap D2 from the first gap D1, and the second gap D2 is filled. Accordingly, the second gap D2 is evenly filled with the adhesive. As described above, it is possible to make the second gap D2 form around the second region R2 to function as an adhering space.

To summarize the above description, the first gap D1 functions as an adhering space. The second gap D2 functions as a space for positioning the spool body 14 in the radial direction in relation to the spool shaft 20 in the second region R2 and, moreover, functions as an adhering space. The third gap D3 functions as an adhering space and, moreover, functions as a storage space for the excess adhesive that infiltrated from the first gap D1.

When the adhesive is disposed between the insertion hole 64d of the spool body 14 and the mounted part 120 of the spool shaft 20 as described above and the prescribed time lapses, the adhesive hardens, and the spool body 14 is fixed to the spool shaft 20.

4. Characteristics (A-1) The present spool device 9 comprises a spool shaft 20 and a spool body 14. The spool shaft 20 is mounted rotatably to the reel body 11. The spool body 14 is mounted to the spool shaft 20. The spool device 9 includes a notch part 114 and a protruding pin 116. The notch part 114 is disposed on the spool body 14. The notch part 114 is cut out in the axial direction of the spool shaft 20. The protruding pin 116, for example, the extreme end portion of the protruding pin 116, is disposed on the spool shaft 20. The protruding pin 116 engages with the notch part 114.

In the present spool device 9, the notch part 114 where the protruding pin 116 is engaged is cut out in the axial direction of the spool shaft 20. Therefore, when mounting the spool body 14 to the spool shaft 20, the protruding pin 116 can easily engaged the notch part 114 by inserting the spool shaft 20 into the spool body 14. Accordingly, when mounting the spool body 14 to the spool shaft 20, the protruding pin 116 and the notch part 114 can be engaged with visual confirmation. Therefore, the spool device 9 can be easily assembled.

(B-1) In the present spool device 9, the notch part 114 has an open end section 114a, a first contact section 114b, and a second contact section 114c. The open end section 114a opens in the axial direction of the spool shaft 20. The protruding pin 116 makes contact with the first contact section 114b in the rotational direction of the spool shaft 20. The protruding pin 116 makes contact with the second contact section 114c in the axial direction of the spool shaft 20.

In this configuration, the spool body 14 is positioned in the axial direction of the spool shaft 20 by inserting the protruding pin 116 into the notch part 114 from the open end section 114a and having this protruding pin 116 contact the second contact section 114c. Also, in this state, this protruding pin 116 is positioned in the rotational direction of the spool shaft 20 according to the first contact section 114b. Accordingly, the spool body 14 can be easily positioned in relation to the spool shaft 20.

(C-1) In the present spool device 9, the spool body 14 has a mounting portion 14d for mounting the spool shaft 20. The spool shaft 20 has a shaft body part 115 and a mounted part 120. The mounted part 120 is disposed on the outer periphery of the shaft body part 115, and the spool body 14 is mounted thereon. The notch part 114 is disposed on the end portion of the mounting portion 14d in the axial direction of the spool shaft 20.

In this configuration, the notch part 114 is disposed on the end portion of the mounting portion 14d of the spool body 14 in the axial direction of the spool shaft 20. Therefore, the protruding pin 116 can easily engaged the notch part 114 by mounting the mounting portion 14d of the spool body 14 to the mounted part 120 of the spool shaft 20. Accordingly, the spool device 9 can be easily assembled.

(D-1) In the present spool device 9, the protruding pin 116 protrudes in the radial direction of the spool shaft 20. In this configuration, the protruding pin 116 protrudes in the radial direction of the spool shaft 20; therefore, the protruding pin 116 can easily engage the notch part 114 by inserting the spool shaft 20 into the spool body 14. Accordingly, the spool device 9 can be easily assembled.

(E-1) In the present spool device 9, the spool shaft 20 has a pin mounting hole 120a. The protruding pin 116 is a protruding pin 116 mounted in the pin mounting hole 120a. In this configuration, the protruding pin 116 can be easily formed by mounting the protruding pin 116 in the pin mounting hole 120a disposed on the spool shaft 20.

(F-1) In the present spool device 9, the pin mounting hole 120a is disposed on the spool shaft 20. The pin mounting hole 120a is a through-hole that penetrates the spool shaft 20 in the radial direction. The protruding pin 116 is longer than the diameter of the spool shaft 20. In the state in which the protruding pin 116 has been mounted in the through-hole, both end portions of the protruding pin 116 protrude from the spool shaft 20. In this configuration, both end portions of the protruding pin 116 protrude from the spool shaft 20 by mounting the protruding pin 116 in the through-hole. Therefore, the protruding pin 116 can be easily formed.

(G-1) In the present spool device 9, the protruding pin 116 is fixed to the pin mounting hole 120a by caulking. In this configuration, the protruding pin 116 can be formed easily without preparing any other special members simply by fixing the protruding pin 116 in the pin mounting hole 120a by caulking. Accordingly, the protruding pin 116 can also be fixed easily.

SECOND EMBODIMENT

In the second embodiment, the configuration of the spool shaft 20 varies from that of the first embodiment. The configurations other than that of the spool shaft 20 are the same as in the first embodiment. Therefore, here that description has been omitted. Also, the same reference symbols are used for the configurations identical to those in the first embodiment. The configurations that were omitted here shall be based on the descriptions in the first embodiment.

1. Configuration of the Spool Shaft

As illustrated in FIG. 9, the spool shaft 20 has a shaft body part 115 and a protruding pin 116. The mounted part 120 of the shaft body part 115, for example, the large-diameter section 20a, has a pin mounting hole 120a disposed in the radial direction of the spool shaft 20. The pin mounting hole 120a is a hole with a bottom disposed in the radial direction of the spool shaft 20 in the mounted part 120. A protruding pin 116 (one example of the protruding portion) is mounted in the pin mounting hole 120a.

The protruding pin 116 protrudes outward from the outer peripheral surface of the shaft body part 115. The protruding pin 116 is shorter than the diameter of the shaft body part 115 in the mounted part 120 and is longer than the depth of the pin mounting hole 120a. In a state in which the protruding pin 116 is mounted in the pin mounting hole 120a, one end portion of the protruding pin 116 protrudes from the outer peripheral surface of the spool shaft 20, and the other end portion of the protruding pin 116 is disposed inside of the pin mounting hole 120a. For example, the protruding pin 116 is fixed to the pin mounting hole 120a by caulking.

2. Characteristics (A-2) In the present spool device 9, the protruding pin 116 can be easily mounted in the pin mounting hole 120a because all that is necessary if the protrusion of just the one end portion of the protruding pin 116.

(B-2) Except for (E-1), the same effects as (A-1)~(G-1) in the first embodiment can be attained.

THIRD EMBODIMENT

In the third embodiment, the configuration of the spool device 9 varies from that in the first embodiment. The configurations other than that of the spool device 9 are the same as those described in the first embodiment. Therefore, these descriptions have been omitted. Also, the same reference symbols are used for the configurations identical to those in the first embodiment. The configurations that were omitted here shall be based on the descriptions in the first embodiment.

1. Configuration of the Spool Device

As illustrated in FIG. 10A to FIG. 10C, the spool device 9 is primarily includes a spool body 14 and a spool shaft 20. The spool body 14 has a shell portion 14b, a flange portion 14a, and a mounting portion 14d.

The mounting portion 14*d* has a mounting part body 214*a* and a bent portion 214*b* (one example of the protruding portion). The mounting part body 214*a* is formed into a cylindrical shape. The bent portion 214*b* is the portion where one end portion of the mounting part body 214*a* in the axial direction of the spool shaft 20 was bent to the inner peripheral side. In other words, the bent portion 214*b* is formed by partially bending the one end portion of the mounting part body 214*a* towards the spool shaft 20 side. The bent portion 214*b* has a third contact section 214*c* and a fourth contact section 214*d*. The third contact section 214*c* 7 contacts the notch part 114 in the rotational direction of the spool shaft 20. The fourth contact section 214*d* contacts the notch part 114 in the axial direction of the spool shaft 20.

The spool shaft 20 has a shaft body part 115, a groove part 117, and a mounted part 120. The groove part 117 is disposed in the axial direction of the spool shaft 20 at the outer peripheral portion of the shaft body part 115. The groove part 117 has a pair of first wall parts 117*a* (one example of the first contact section) and a second wall part 117*b* (one example of the second contact section). The pair of first wall parts 117*a* is disposed to oppose each other in the rotational direction of the spool shaft 20. The second wall part 117*b* is the wall part that connects the pair of first wall parts 117*a*. Specifically, the second wall part 117*b* is the wall part that forms the end portion of the groove part 117.

The groove part 117 includes a notch part 114. The notch part 114 is the section that was disposed on the mounted part 120 in the groove part 117. The notch part 114 is disposed on the end portion of the mounted part 120 of the spool shaft 20 in the axial direction of the spool shaft 20. The notch part 114 has a pair of first contact sections 114*b* (one example of the one portion of the first wall part 117*a*) and a second contact section 114*c* (the second wall part 117*b*).

As illustrated in FIG. 10A and FIG. 10C, the first contact section 114*b* is one portion of the first wall part 117*a*. Specifically, the first contact section 114*b* is formed to the end portion of the mounted part 120 and the end portion of the first wall part 117*a*. The third contact section 214*c* of the bent portion 214*b* contacts the first contact section 114*b* in the rotational direction of the spool shaft 20. The second contact section 114*c* is the second wall part 117*b*. The fourth contact section 214*d* of the bent portion 214*b* contacts the second contact section 114*c* in the axial direction of the spool shaft 20.

(A-3) In the spool device 9, the notch part 114 is one portion of the groove part 117 disposed in the axial direction of the spool shaft 20. In this case, the spool device 9 can be assembled easily by moving the bent portion 214*b* of the spool body 14 along the groove part 117 of the spool shaft 20 and engaging the end portion of the groove part 117.

(B-3) In the present spool device 9, the notch part 114 has a first contact section 114*b* and a second contact section 114*c*. The bent portion 214*b* contacts the first contact section 114*b* in the rotational direction of the spool shaft 20. The bent portion 214*b* contacts the second contact section 114*c* in the axial direction of the spool shaft 20. The groove part 117 has a first wall part 117*a* and a second wall part 117*b*. The first wall part 117*a* is disposed in the rotational direction of the spool shaft 20. The second wall part 117*b* is provided in the axial direction of the spool shaft 20. Here, the first wall part 117*a* includes the first contact section 114*b*, and the second wall part 117*b* includes the second contact section 114*c*.

In this configuration, the spool body 14 is positioned in relation to the axial direction of the spool shaft 20 by inserting the bent portion 214*b* into the groove part 117 of the spool shaft 20 and having this bent portion 214*b* contact the second contact section 114*c* (the second wall part 117*b*) of the notch part 114. Also, in this state, this bent portion 214*b* is positioned in relation to the rotational direction of the spool shaft 20 by the first contact section 114*b* (one portion of the first wall part 117*a*) of the notch part 114. Accordingly, the spool body 14 can be positioned easily in relation to the spool shaft 20.

(C-3) In the present spool device 9, the spool body 14 has a mounting portion 14*d* for mounting to the spool shaft 20. The bent portion 214*b* is formed by partially bending the end portion of the mounting portion 14*d* in the axial direction of the spool shaft 20 towards the spool shaft 20. In this case, the protruding portion can be formed easily by bending the end portion of the mounting portion 14*d* in the axial direction of the spool shaft 20 towards the spool shaft 20.

(D-3) In the present spool device 9, the bent portion 214*b* has a third contact section 214*c* and a fourth contact section 214*d*. The third contact section 214*c* makes contact with the first contact section 114*b* of the notch part 114 in the rotational direction of the spool shaft 20. The fourth contact section 214*d* makes contact with the second contact section 114*c* of the notch part 114 in the axial direction of the spool shaft 20. In this case, the spool body 14 is positioned in relation to the rotational direction of the spool shaft 20 by the third contact section 214*c* of the bent portion 214*b* making contact with the first contact section 114*b* of the notch part 114. Also, the spool body 14 is positioned in the axial direction of the spool shaft 20 by the fourth contact section 214*d* of the bent portion 214*b* making contact with the second contact section 114*c* of the notch part 114. Accordingly, the spool body 14 can be positioned easily in relation to the spool shaft 20.

OTHER EMBODIMENTS

In the first and second embodiments, a case in which the protruding pin 116 is fixed by caulking was shown. However, the mode for fixing the protruding pin 116 can be any mode. For example, the protruding pin 116 can be fixed to the pin mounting hole 120*a* by adhesion. Also, forming a female screw portion on the pin mounting hole 120*a*, forming a male screw portion on the protruding pin 116, and screwing the protruding pin 116 into the pin mounting hole 120*a* are possibilities. Even with this configuration, the same effects as those described above can be attained.

In the first and second embodiments, an example of a case in which the protruding pin 116 is disposed on the spool shaft 20 was shown. However, the protruding pin 116 can be mounted to the spool body 14. In this case, a pin mounting hole 120*a* identical to that in the first and second embodiments is formed on the mounting portion 14*d* of the spool body 14. Also, a groove part 117 (the notch part 114) where the protruding pin 116 is engaged is formed on the spool shaft 20 as in the third embodiment. Even with this configuration, the same effects as those described above can be attained.

The present invention can be used extensively in fishing reels and spool devices.

What is claimed is:
1. A spool device for a fishing reel, comprising:
 a spool shaft configured to be rotatably disposed on a fishing reel body;
 a spool body mounted on the spool shaft;
 a notch part disposed on one of the spool body and the spool shaft, and being formed in an axial direction of the spool shaft; and a protruding portion disposed on the other of the spool body and the spool shaft, and being configured to engage the notch part in the axial direction of the spool shaft so as to axially position the spool shaft in relation to the spool body.

2. The spool device for the fishing reel according to claim 1, wherein
the notch part has an open end section that opens in the axial direction of the spool shaft, a first contact section, and a second contact section, the protruding portion being configured to contact the first contact section in a rotational direction of the spool shaft and being configured to contact the second contact section in the axial direction of the spool shaft.

3. The spool device for the fishing reel according to claim 1, wherein
the spool body has a mounting part to mount to the spool shaft,
the spool shaft has a shaft body part and a mounted part disposed on the outer periphery of the shaft body part, the mounted part to be mounted the mounting part of the spool body, and
the notch part is disposed on an end portion of one of the mounting part and the mounted part in the axial direction of the spool shaft.

4. The spool device for the fishing reel according to claim 3, wherein
the notch part is disposed on the end portion of the mounting part of the spool body.

5. The spool device for the fishing reel according to claim 3, wherein
the notch part is disposed on the end portion of the mounted part of the spool shaft.

6. The spool device for the fishing reel according to claim 5, further comprising
the notch part is one portion of a groove part which is disposed on the end portion of the mounted part of the spool shaft in the axial direction of the spool shaft.

7. The spool device for the fishing reel according to claim 1, wherein
the protruding portion protrudes in the radial direction of the spool shaft.

8. The spool device for the fishing reel according to claim 1, wherein
one of the spool body and the spool shaft has a mounting hole disposed in a radial direction of the spool shaft and the protruding portion is a protruding pin disposed in the mounting hole.

9. The spool device for the fishing reel according to claim 8, wherein
the protruding pin is fixed to the mounting hole by caulking.

10. The spool device for the fishing reel according to claim 8, wherein
the protruding pin is fixed to the mounting hole by bonding.

11. The spool device for the fishing reel according to claim 8, wherein
the mounting hole has a female screw portion,
the protruding pin has a male screw portion engaging the female screw portion, and the protruding pin is screwed into the mounting hole.

12. The spool device for the fishing reel according to claim 8, wherein
the mounting hole is disposed on the spool shaft and is a through-hole that penetrates the spool shaft in the radial direction,
the protruding pin is longer than a diameter of the spool shaft, and
at least one of two end portions of the protruding pin protrudes from the spool shaft when the protruding pin is disposed in the through-hole.

13. A spool device for the fishing reel, comprising:
a spool shaft configured to be rotatably disposed on a fishing reel body;
a spool body mounted on the spool shaft;
a notch part disposed on one of the spool body and the spool shaft, and being formed in an axial direction of the spool shaft; and
a protruding portion disposed on the other of the spool body and the spool shaft, and
being configured to engage the notch part,
the notch part having a first contact section and a second contact section, the first contact section contacting the protruding portion in a rotational direction of the spool shaft, and the second contact section contacting the protruding portion in the axial direction of the spool shaft,
the groove part having a first wall part and a second wall part, the first wall part being disposed in the rotational direction of the spool shaft and the second wall part being disposed in the axial direction of the spool shaft, and
the first wall part including the first contact section, and the second wall part including the second contact section.

14. A spool device for the fishing reel, comprising:
a spool shaft configured to be rotatably disposed on a fishing reel body;
a spool body mounted on the spool shaft;
a notch part disposed on one of the spool body and the spool shaft, and being formed in an axial direction of the spool shaft; and
a protruding portion disposed on the other of the spool body and the spool shaft, and being configured to engage the notch part, the protruding portion protruding in the radial direction of the spool shaft,
the spool having a mounting part to mount the spool to the spool shaft, and
the protruding portion being a bent portion disposed on an end portion of the mounting part in axial direction of the spool shaft, the bent portion is formed partially bent at the end portion of the mounting part towards the spool shaft.

15. The spool device for the fishing reel according to claim 14, wherein
the bent portion has a third contact section and a fourth contact section, the third contact section contacts the notch part in a rotational direction of the spool shaft and the fourth contact section contacts the notch part in the axial direction of the spool shaft.

* * * * *